(12) United States Patent
Nakajima et al.

(10) Patent No.: US 10,113,596 B2
(45) Date of Patent: Oct. 30, 2018

(54) POWER TRANSMISSION DEVICE

(71) Applicant: DENSO CORPORATION, Kariya, Aichi-pref. (JP)

(72) Inventors: Hiroshi Nakajima, Kariya (JP); Youhei Kushida, Kariya (JP); Kiyomi Okuda, Kariya (JP); Akira Kishibuchi, Kariya (JP); Toshihiro Hayashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 16 days.

(21) Appl. No.: 15/300,701

(22) PCT Filed: Mar. 24, 2015

(86) PCT No.: PCT/JP2015/001664
§ 371 (c)(1),
(2) Date: Sep. 29, 2016

(87) PCT Pub. No.: WO2015/159488
PCT Pub. Date: Oct. 22, 2015

(65) Prior Publication Data
US 2017/0122384 A1    May 4, 2017

(30) Foreign Application Priority Data

Apr. 17, 2014    (JP) ................. 2014-085282

(51) Int. Cl.
| F16D 13/76 | (2006.01) |
| F16D 27/06 | (2006.01) |
| F16F 15/121 | (2006.01) |
| F16D 3/78 | (2006.01) |

(Continued)

(52) U.S. Cl.
CPC ............. *F16D 13/76* (2013.01); *F16D 3/78* (2013.01); *F16D 9/00* (2013.01); *F16D 13/40* (2013.01);

(Continued)

(58) Field of Classification Search
None
See application file for complete search history.

(56) References Cited

U.S. PATENT DOCUMENTS

| 4,859,156 A | 8/1989 | Kikuchi |
| 5,445,256 A | 8/1995 | Tabuchi et al. |

(Continued)

FOREIGN PATENT DOCUMENTS

| JP | H06030535 U | 4/1994 |
| JP | H06039105 Y | 10/1994 |

(Continued)

*Primary Examiner* — Mark A Manley
(74) *Attorney, Agent, or Firm* — Harness, Dickey & Pierce, P.L.C.

(57) ABSTRACT

A power transmission device that transmits a rotational driving force outputted from a driving source to a target device to be driven includes: a driving rotor rotated by the rotational driving force; a driven rotor that rotates with a rotary shaft of the target device; and a connection member. The connection member has a plate shape extending perpendicular to the rotary shaft. The connection member is connected at least one of the driving rotor and the driven rotor, and is capable of connecting the driving rotor and the driven rotor to each other. The connection member has a through hole, and the driven rotor has an overlapping portion disposed overlapping with the through hole when viewed in the axial direction of the rotary shaft.

9 Claims, 5 Drawing Sheets

(51) Int. Cl.
  *F16D 9/00* (2006.01)
  *F16H 7/08* (2006.01)
  *F16D 13/40* (2006.01)
  *F16H 55/36* (2006.01)
  *B60K 25/02* (2006.01)

(52) U.S. Cl.
  CPC .......... *F16D 27/06* (2013.01); *F16F 15/1216* (2013.01); *F16H 7/0827* (2013.01); *F16H 55/36* (2013.01); *B60K 25/02* (2013.01); *F16H 2055/366* (2013.01)

(56) References Cited

U.S. PATENT DOCUMENTS

| | | |
|---|---|---|
| 6,200,221 B1 | 3/2001 | Maejima et al. |
| 6,209,699 B1 * | 4/2001 | Hayashi ................ F16D 27/112 192/200 |
| 6,332,842 B1 | 12/2001 | Tabuchi et al. |
| 6,648,781 B1 | 11/2003 | Fischer et al. |
| 2002/0052242 A1 | 5/2002 | Tabuchi et al. |
| 2005/0183923 A1 | 8/2005 | Konishi et al. |
| 2011/0127136 A1 * | 6/2011 | Sakuraba ............... F16D 27/112 192/66.31 |
| 2016/0053876 A1 | 2/2016 | Nakamura et al. |

FOREIGN PATENT DOCUMENTS

| | | |
|---|---|---|
| JP | 2000337480 A | 12/2000 |
| JP | 2001041308 A | 2/2001 |
| JP | 2002206564 A | 7/2002 |
| JP | 3421619 B2 | 6/2003 |
| JP | 2003214336 A | 7/2003 |
| JP | 2004293734 A | 10/2004 |
| JP | 2005233338 A | 9/2005 |
| JP | 2014202293 A | 10/2014 |

* cited by examiner

POWER TRANSMISSION DEVICE

CROSS REFERENCE TO RELATED APPLICATIONS

This application is a U.S. National Phase Application under 35 U.S.C. 371 of International Application No. PCT/JP2015/001664 filed on Mar. 24, 2015 and published in Japanese as WO 2015/159488 A1 on Oct. 22, 2015. This application is based on and claims the benefit of priority from Japanese Patent Application No. 2014-085282 filed on Apr. 17, 2014. The entire disclosures of all of the above applications are incorporated herein by reference.

TECHNICAL FIELD

The present disclosure relates to a power transmission device that transmits rotational driving force.

BACKGROUND ART

Conventionally, a variety of power transmission devices are known, which transmit rotational driving force output from a drive source to a target device to be driven.

Patent Literature 1 discloses, as a power transmission device, an electromagnetic clutch that transmits a rotational driving force outputted from an engine to a compressor of a refrigeration cycle. The electromagnetic clutch includes a cover that covers the outer circumference side of the electromagnetic clutch to suppress foreign objects such as water and dusts from intruding into a frictional surface of the clutch or a bearing forming an attachment portion to the compressor.

PRIOR ART LITERATURES

Patent Literature

Patent Literature 1: JP 2004-293734 A

SUMMARY OF INVENTION

However, when the cover that suppresses the intrusion of foreign objects is provided, the number of components increases, leading to an increase in man-hours for assembling of the power transmission device as well as an increase in manufacturing cost.

An object of the present disclosure is to provide a power transmission device that can suppress intrusion of foreign objects without increasing the number of components.

According to an aspect of the present disclosure, a power transmission device that transmits a rotational driving force outputted from a driving source to a target device to be driven includes: a driving rotor rotated by the rotational driving force; a driven rotor that rotates with a rotary shaft of the target device; and a connection member having a plate shape extending perpendicular to the rotary shaft and being connected at least one of the driving rotor and the driven rotor. The driving rotor and the driven rotor are able to be connected to each other through the connection member.

The connection member has a through hole passing through the connection member in an axial direction of the rotary shaft. The driven rotor has an overlapping portion disposed overlapping with the through hole when viewed in the axial direction of the rotary shaft.

The driven rotor is essential to transmit the rotational driving force outputted from the driving source to the target device to be driven.

Since the essential driven rotor includes the overlapping portion, the overlapping portion can cover the through hole of the connection member without increasing the number of components. This can suppress foreign objects from intruding into the power transmission device through the through hole without increasing the number of components.

When the connection member is connected to both of the driving rotor and the driven rotor, the connection member may be a plate-like elastic member that absorbs a variation of a rotational torque transmitted from the driving rotor to the driven rotor. The connection member may be a plate-like elastic member that imposes a load on at least one of the driving rotor and the driven rotor in the axial direction of the rotary shaft.

To ensure sufficient elastic deformation, the plate-like elastic member generally has a through hole penetrating the front and rear faces of the member. Further, to ensure sufficient elastic deformation, the through hole has a suitable shape. However, since the driven rotor includes the overlapping portion, intrusion of foreign objects into the power transmission device can be advantageously suppressed irrespective of the shape of the through hole.

According to an aspect of the present disclosure, a power transmission device that transmits a rotational driving force outputted from a driving source to a target device to be driven includes: a driving rotor rotated by the rotational driving force; a driven rotor rotated with a rotary shaft of the target device; an electromagnet that generates an electromagnetic force connecting the driven rotor and the driving rotor; and a buffer member that dampens a shock caused when the driven rotor and the driving rotor are connected to each other.

The driven rotor has a through hole passing through the driven rotor in an axial direction of the rotary shaft, and the buffer member has an overlapping portion disposed overlapping with the through hole when viewed in the axial direction of the rotary shaft.

In a power transmission device that connects the driven rotor to the driving rotor by an electromagnetic force generated from an electromagnet (that is, electromagnetic clutch), a through hole that enforces the electromagnetic force is formed in a portion of the driven rotor. A general electromagnetic clutch includes a buffer member that dampens a shock caused when the driven rotor is connected to the driving rotor by the electromagnetic force.

The buffer member of the general electromagnetic clutch has an overlapping portion, and the overlapping portion can cover the through hole without increasing the number of components. This can suppress foreign objects from intruding into the power transmission device through the through hole without increasing the number of components.

DESCRIPTION OF EMBODIMENTS

First Embodiment

Figure 1:
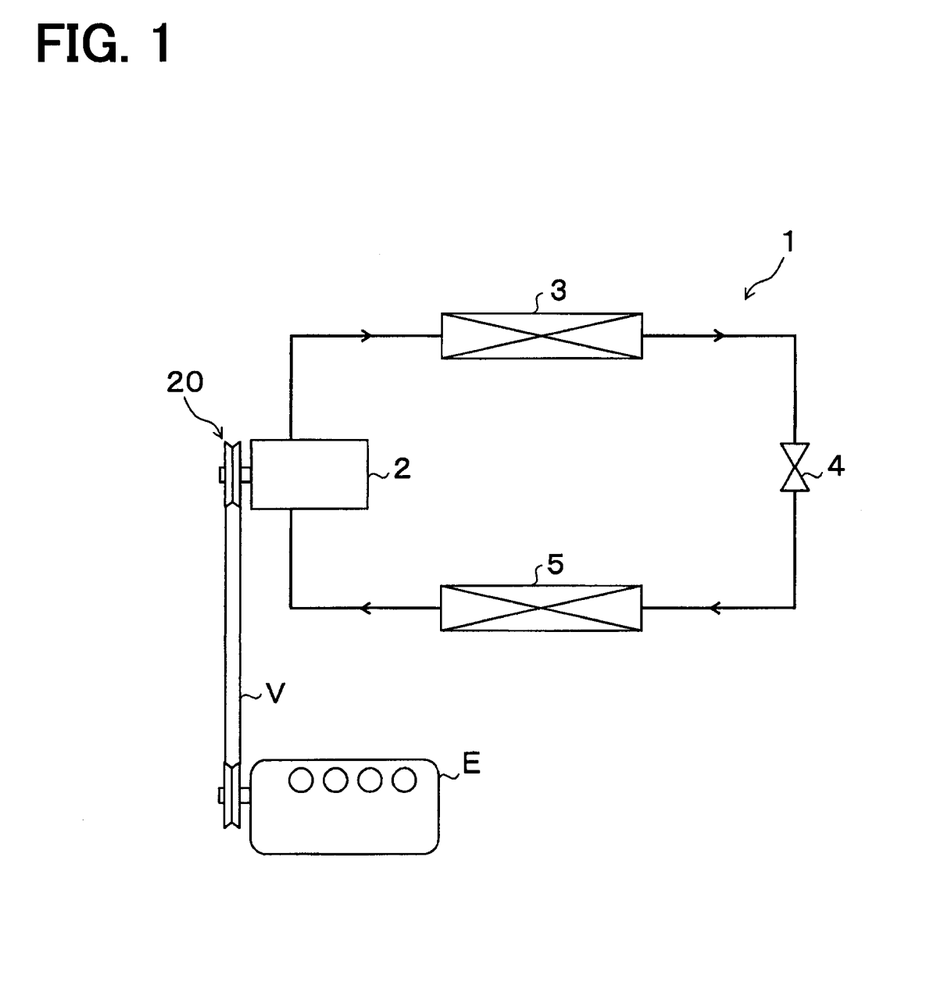
FIG. 1 is an entire configuration view illustrating a refrigeration cycle, to which a power transmission device according to a first embodiment is applied.

A first embodiment will be described below with reference to FIG. 1 to FIG. 3. A power transmission device 20 in the present embodiment transmits a rotational driving force outputted from an internal combustion engine (engine) E mounted in a vehicle to a compressor 2 of a vapor compression refrigeration cycle 1. In the present embodiment, a driving source is the engine E, and a target device to be driven is the compressor 2.

The refrigeration cycle 1 in the present embodiment cools ventilating air in an air conditioner for a vehicle, which is sent into a passenger compartment. More specifically, as illustrated in FIG. 1, the refrigeration cycle 1 is configured by sequentially connecting the compressor 2, a radiator 3, a temperature expansion valve 4, and an evaporator 5 via a pipe.

The compressor 2 compresses a refrigerant, and discharges the compressed refrigerant in the refrigeration cycle 1. In the present embodiment, a swash-plate variable displacement compressor is employed as the compressor 2. In the variable displacement compressor, discharge capacity is decreased to substantially 0, thereby disabling the compressor 2 to discharge the refrigerant.

Therefore, in the present embodiment, the power transmission device 20 adopts a clutch-less configuration in which the engine E is connected to the compressor 2 at all times via a belt V. The discharge capacity (refrigerant discharge capability) of the compressor 2 is controlled according to a control signal outputted from a controller not illustrated to a discharge capacity control valve of the compressor 2.

The radiator 3 is a heat-radiating heat exchanger that exchanges heat between the high-temperature high-pressure refrigerant discharged from the compressor 2 and the outside air to condense the refrigerant.

The temperature expansion valve 4 is a pressure-reducing means that includes a temperature sensitive portion for sensing the degree of superheat of the refrigerant on the outlet side of the evaporator 5 based on temperature and pressure of the refrigerant on the outlet side of the evaporator 5, and mechanically adjusts throttle opening such that the degree of superheat of the refrigerant on the outlet side of the evaporator 5 falls within a predetermined reference range.

The evaporator 5 is a heat-absorbing heat exchanger that exchanges heat between the low-pressure refrigerant decompressed by the temperature expansion valve 4 and ventilating air sent into the passenger compartment, and evaporates the low-pressure refrigerant to absorb heat.

Next, the power transmission device 20 will be described below. As illustrated in FIGS. 2 and 3, the power transmission device 20 includes a pulley 21 rotated by the rotational driving force outputted from the engine E, an inner hub 22 that rotates with a rotary shaft 2a of the compressor 2, and a plate 26 connected to both of the pulley 21 and the inner hub 22. FIG. 2 is an axial partial sectional view illustrating of the power transmission device 20 taken along a line II-II in FIG. 3.

The pulley 21 includes an outer cylindrical portion 21a, an inner cylindrical portion 21b, and an end face portion 21c. The outer cylindrical portion 21a is cylindrical, and is disposed coaxially with the rotary shaft 2a of the compressor 2. The inner cylindrical portion 21b is cylindrical, and is disposed on the inner circumferential side of the outer cylindrical portion 21a, and coaxially with the rotary shaft 2a. The end face portion 21c extends to connect ends of the outer cylindrical portion 21a and the inner cylindrical portion 21b to each other on the opposite side to the compressor 2.

Figure 2:
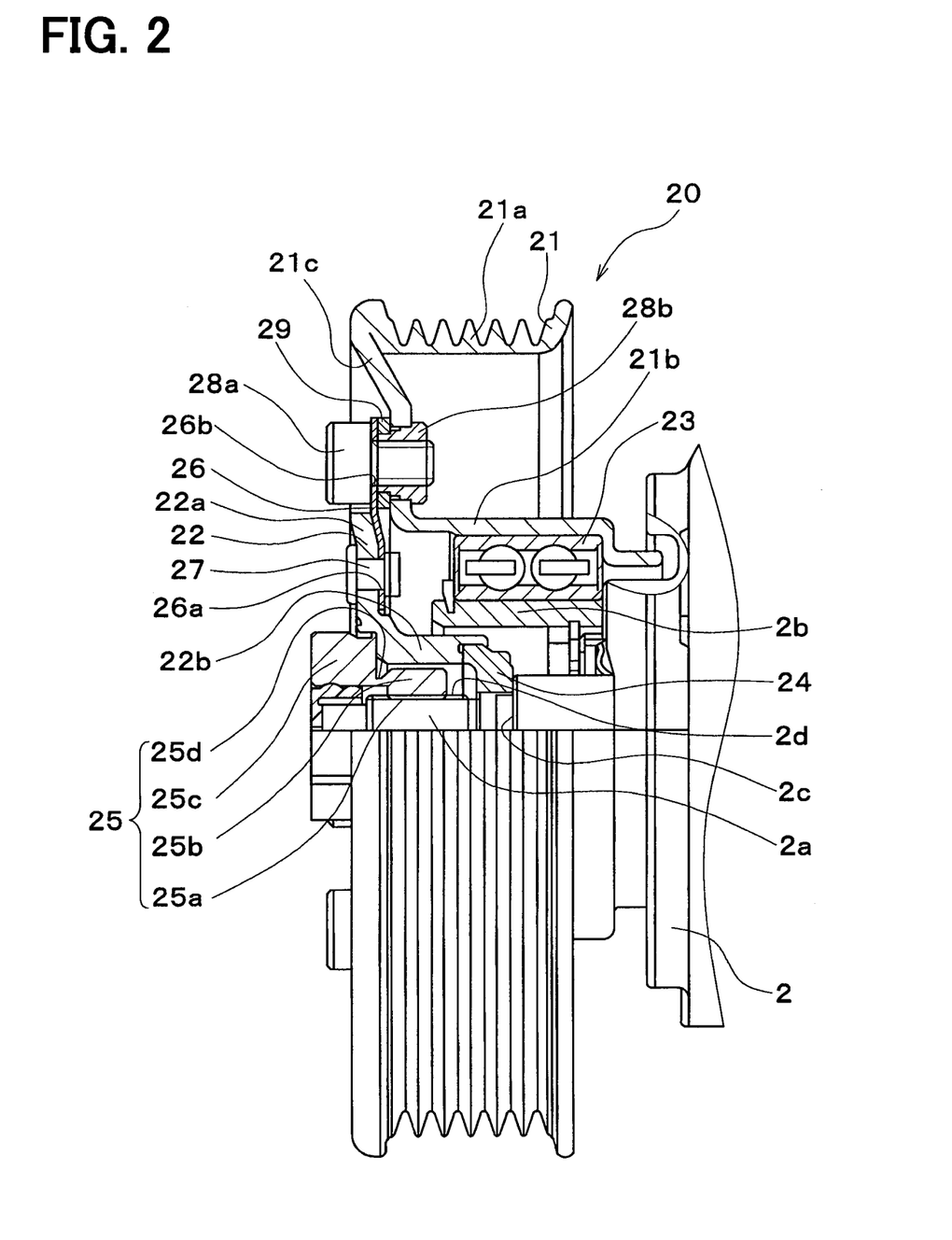
FIG. 2 is an axial partial sectional view illustrating the power transmission device according to the first embodiment.

As illustrated in FIG. 2, the pulley 21 has substantially inverted C-like radial cross section. A V-groove (specifically, poly-V groove), on which the belt V that transmits the rotational driving force outputted from the engine E hangs, is formed in the outer circumference of the outer cylindrical portion 21a.

The outer circumference of a ball bearing 23 is fixed to the inner circumference of the inner cylindrical portion 21b, and a cylindrical boss 2b that protrudes from a housing forming an outer shell of the compressor 2 toward the power transmission device 20 in the axial direction is fixed to the inner circumference of the ball bearing 23. Thereby, the pulley 21 is fixed to the housing of the compressor 2 so as to be rotatable coaxially with the rotary shaft 2a.

The inner hub 22 includes a disc-like portion 22a having a circular through hole penetrating the center of the inner hub 22 in the axial direction, and a cylindrical portion 22b extending coaxially with the rotary shaft 2a.

As illustrated in FIG. 2, the inner diameter of the disc-like portion 22a of the inner hub 22 has the substantially same size as the outer diameter of the cylindrical portion 22b. As illustrated in FIG. 3, the outer diameter of the disc-like portion 22a is the substantially same as the outer diameter of the plate 26. Therefore, the disc-like portion 22a is annular, and extends to overlap with the substantially entire region of the plate 26 when viewed in the axial direction of the rotary shaft 2a.

A washer 24 made of iron-based metal having a relatively high hardness is bonded to an axial end of the cylindrical portion 22b of the inner hub 22 on the side of the compressor 2 by spot welding or swaging.

The washer 24 is annular, and the rotary shaft 2a of the compressor 2 is inserted on the inner circumferential side of the washer 24. An end face of the washer 24 on the side of the compressor 2 in the direction of the rotary shaft 2a abuts on a stepped portion 2c of the rotary shaft 2a. The stepped portion 2c prevents the washer 24 and the inner hub 22 from displacing toward the compressor 2 along the rotary shaft 2a.

A limiter (power blocking member) 25 made of iron-based metal is bonded to an axial end of the cylindrical portion 22b of the inner hub 22 on the opposite side to the compressor 2 by spot welding or swaging.

The limiter 25 includes a cylindrical portion 25b having a female screw 25a screwed with a male screw 2d of the rotary shaft 2a, and a pressure reception portion 25c that receives a load generated when the cylindrical portion 25b is fastened in the rotational direction of the rotary shaft 2a, along with the washer 24. A break portion 25d, which breaks when the load imposed on the pressure reception portion 25c becomes a reference load or more, is formed on the site where the cylindrical portion 25b and the pressure reception portion 25c of the limiter 25 are connected to each other.

The cylindrical portion 25b of the limiter 25 is disposed on the inner circumferential side of the cylindrical portion 22b of the inner hub 22 so as to be coaxial with the rotary shaft of the compressor 2. Since the outer diameter of the cylindrical portion 25b is smaller than the inner diameter of the cylindrical portion 22b of the inner hub 22, the outer circumferential face of the cylindrical portion 25b of the limiter 25 never contacts the inner circumferential face of the cylindrical portion 22b of the inner hub 22.

The pressure reception portion 25c is annular, and has a through hole that penetrates its rotational center in the axial direction, and an axial end of the cylindrical portion 22b of the inner hub 22 is bonded to the outer circumferential side by spot welding or swaging.

The break portion 25d has a diameter that is smaller than the outer diameter of the cylindrical portion 25b. That is, the break portion 25d has a smaller diameter than the cylindrical portion 25b as well as the pressure reception portion 25c. In other words, the break portion 25d is formed of a thinned portion of the limiter 25.

The plate 26 is formed of a substantially disc-like metal member that extends perpendicular to the rotary shaft 2a of the compressor 2. More specifically, the plate 26 is a plate-like elastic member (plate spring) that is deformable in the rotational direction and the axial direction of the rotary shaft 2a of the compressor 2. In the present embodiment, the plate 26 is made of spring steel (specifically, S60CM).

The plate 26 has a hub-side attachment portion 26a, to which the inner hub 22 is attached, on the inner circumferential side, and a pulley-side attachment portion 26b, to which the pulley 21 is attached, on the outer circumferential side.

When viewed in the axial direction of the rotary shaft 2a, the hub-side attachment portion 26a is constituted of a plurality of (three in the present embodiment) through holes provided overlapping with the disc-like portion 22a of the inner hub 22. Further, when viewed in the axial direction of the rotary shaft 2a, an inner hub-side through hole penetrates the disc-like portion 22a of the inner hub 22 at a site corresponding to the hub-side attachment portion 26a of the inner hub 22.

The inner hub 22 is connected to the plate 26 with a rivet 27 that penetrates the through holes that constitute the hub-side attachment portion 26a of the plate 26, as well as the inner hub-side through hole formed in the disc-like portion 22a of the inner hub 22.

When viewed in the axial direction of the rotary shaft 2a of the compressor 2, the pulley-side attachment portion 26b is constituted of a plurality of (three in the present embodiment) through holes provided overlapping with the end face portion 21c of the pulley 21. Further, viewed in the axial direction of the rotary shaft 2a of the compressor 2, a pulley-side through hole penetrates the end face portion 21c of the pulley 21 at a site corresponding to the pulley-side attachment portion 26b of the pulley 21.

The pulley 21 is connected to the plate 26 by fastening a bolt 28a, which penetrates the through hole of the pulley-side attachment portion 26b of the plate 26 and the pulley-side through hole formed in the end face portion 21c of the pulley 21, to a nut 28b.

Figure 3:
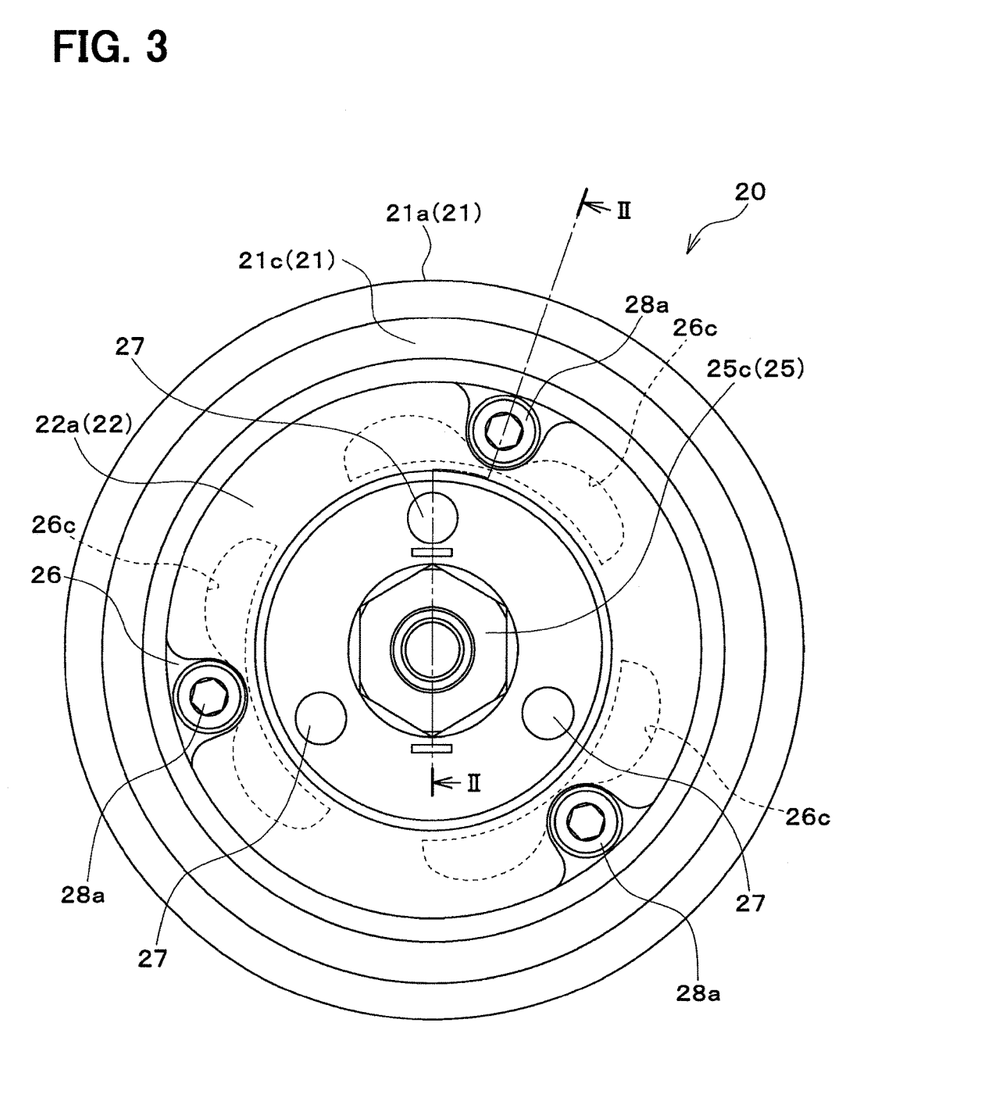
FIG. 3 is a side view illustrating the power transmission device according to the first embodiment.

As represented by thin dotted lines in FIG. 3 when viewed in the axial direction of the rotary shaft 2a, the plate 26 has a plurality of (three in the present embodiment) plate-side through holes 26c penetrating in the axial direction. The plate-side through holes 26c are formed such that the plate 26 can elastically-deform properly and sufficiently when subjected to a load in the rotational direction and the axial direction of the rotary shaft 2a.

The disc-like portion 22a of the inner hub 22 in the present embodiment extends to overlap with the substantially whole region of the plate 26 when viewed in the axial direction of the rotary shaft 2a. Accordingly, the disc-like portion 22a of the inner hub 22 is disposed overlapping with the plate-side through holes 26c of the plate 26.

In the present embodiment, a disc-like shim 29 having a through hole for allowing the bolt 28a to penetrate is interposed between a face of the end face portion 21c of the pulley 21 on the opposite side to the compressor 2, and a face of the plate 26 on the side of the compressor 2.

Thereby, the cylindrical portion 25b of the limiter 25 is screwed with the rotary shaft 2a of the compressor 2. Further, when the pulley 21 is fixed to the plate 26, the plate 26 elastically deforms in the axial direction of the compressor 2, thereby imposing a load on the inner hub 22 so as to separate the inner hub 22 from the compressor 2.

As apparent from the above description, the pulley 21 in the present embodiment corresponds to the driving rotor. The inner hub 22, the washer 24, and the limiter 25 correspond to the driven rotor.

The plate 26 corresponds to the connection member, and may correspond to the plate-like elastic member. The plate-side through hole 26c corresponds to the through hole of the connection member. The disc-like portion 22a of the inner hub 22 corresponds to the overlapping portion of the driven rotor.

Next, the operation of the power transmission device 20 will be described below. Since the power transmission device 20 in the present embodiment has a clutch-less configuration, when the engine E is activated, the rotational driving force outputted from the engine E is transmitted to the pulley 21 that is the driving rotor via the belt V to rotate the pulley 21.

With the rotation of the pulley 21, the plate 26 that constitutes the connection member, the inner hub 22 that constitutes the driven rotor, the washer 24, and the limiter 25 integrally rotate.

At this time, unless the compressor 2 is locked, the rotary shaft 2a of the compressor 2 connected to the driven rotor rotates along with the driven rotor. That is, the rotational driving force outputted from the engine E is transmitted to the rotary shaft 2a of the compressor 2, such that the compressor 2 compresses and ejects a refrigerant in the refrigeration cycle 1.

The plate 26 in the present embodiment is connected to both of the pulley 21 that is the driving rotor and the driven rotor, and elastically deforms in the rotational direction of the rotary shaft 2a, to absorb a variation in the rotational torque transmitted from the driving rotor to the driven rotor.

When the compressor 2 is locked to disable the rotary shaft 2a to rotate, the driven rotor rotates with rotation of the pulley 21, thereby screwing the female screw 25a of the cylindrical portion 25b of the limiter 25 to the male screw 2d of the rotary shaft 2a. Thus, the cylindrical portion 25b of the limiter 25 displaces toward the compressor 2.

Since the pressure reception portion 25c of the limiter 25 cannot displace in the axial direction of the rotary shaft 2a, a tensile stress is applied to the break portion 25d that connects the pressure reception portion 25c to the cylindrical portion 25b. When the load imposed on the pressure reception portion 25c becomes a predetermined value, the break portion 25d breaks to separate the cylindrical portion 25b from the pressure reception portion 25c.

As a result, a portion of the driven rotor other than the cylindrical portion 25b of the limiter 25 is separated from the rotary shaft 2a of the compressor 2, blocking transmission of the rotational driving force from the engine E to the compressor 2.

When the break portion 25d does not break, the plate 26 in the present embodiment imposes a load on the inner hub 22 so as to separate the inner hub 22 from the rotary shaft 2a of the compressor 2. Accordingly, when the break portion 25d breaks, the portion of the driven rotor, which is cut from the rotary shaft 2a of the compressor 2, displaces away from the rotary shaft 2a of the compressor 2.

This can prevent the portion of the driven rotor, which is cut from the rotary shaft 2a of the compressor 2 from contacting the rotary shaft 2a of the compressor 2, after breakage of the break portion 25d, to generate an unusual noise.

As described above, unless the compressor 2 is locked, the power transmission device 20 in the present embodiment can transmit the rotational driving force outputted from the engine E to the compressor 2. When the compressor 2 is locked to disable the rotary shaft 2a to rotate, transmission of the rotational driving force from the engine E to the compressor 2 can be blocked.

In the power transmission device 20 in the present embodiment, the inner hub 22 required to transmit the rotational driving force from the engine E to the compressor 2 has the disc-like portion 22a that is the overlapping portion, such that the plate-side through holes 26c in the plate 26 can be covered without increasing the number of components.

Consequently, foreign objects such as water and dusts can be prevented from intruding into the ball bearing 23 disposed in the power transmission device 20 without increasing manufacturing cost for the power transmission device 20, to improve reliability of the power transmission device 20.

As in the plate 26 in the present embodiment, the plate-like elastic member to be elastically deformed in the rotational direction or the axial direction of the rotary shaft 2a has the plate-side through holes 26c shaped for ensuring sufficient elastic deformation. Accordingly, as in the present embodiment, the overlapping portion (disc-like portion 22a) of the inner hub 22 can advantageously prevent foreign objects from intruding into the power transmission device 20 irrespective of the shape of the plate-side through holes 26c.

As in the present embodiment, when the driving source is the vehicle engine E, and the target device to be driven is the compressor 2 for an air conditioner in the refrigeration cycle 1, the compressor 2 is generally disposed in an engine compartment outside of the passenger compartment. In this case, as compared to the case where the compressor 2 is disposed within the passenger compartment, foreign objects intrude into the power transmission device more easily. Therefore, as in the power transmission device 20 in the present embodiment, it is extremely advantageous that intrusion of foreign objects can be prevented.

Second Embodiment

Figure 4:
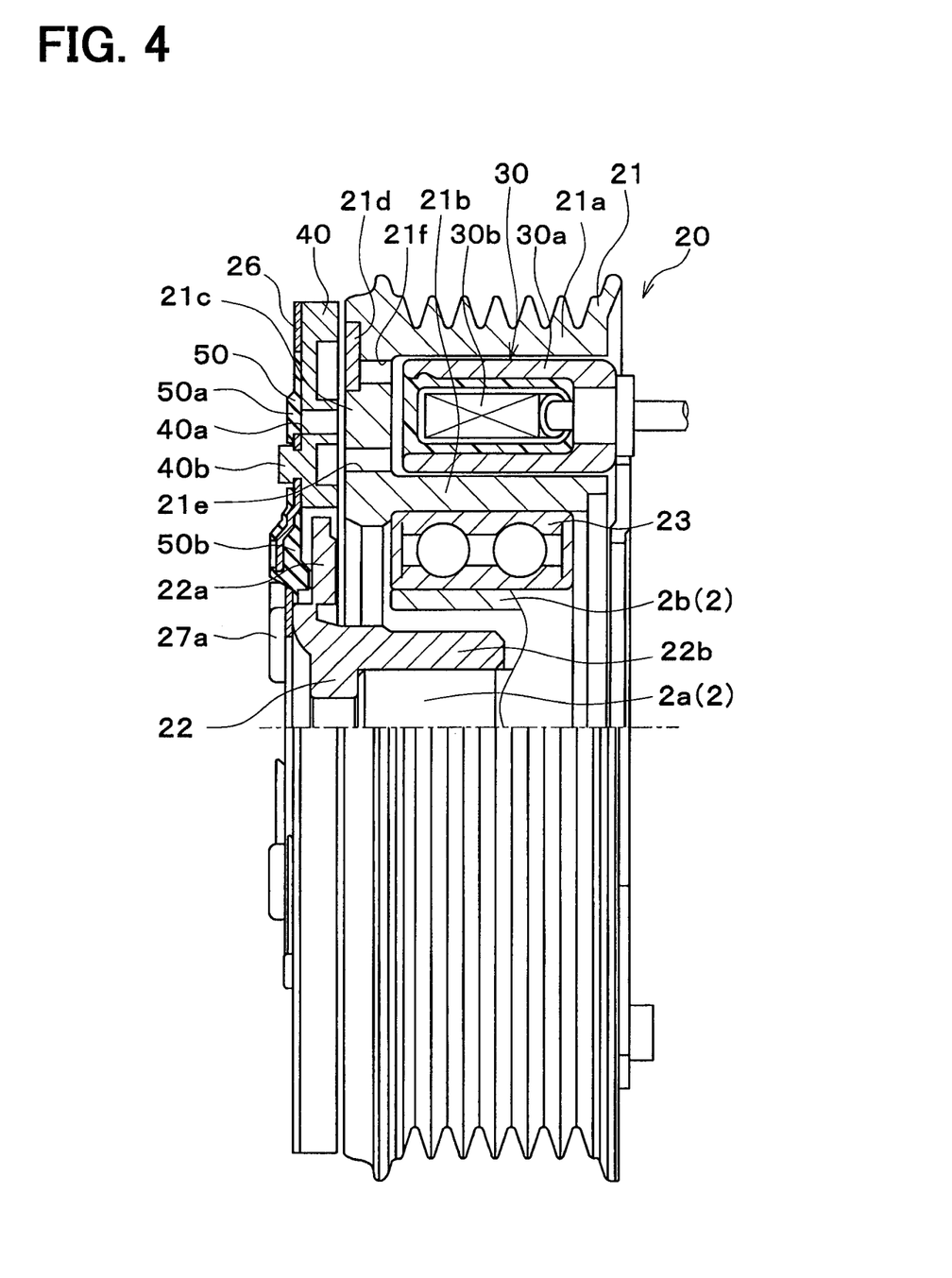
FIG. 4 is an axial partial sectional view illustrating a power transmission device according to a second embodiment.
Figure 5:
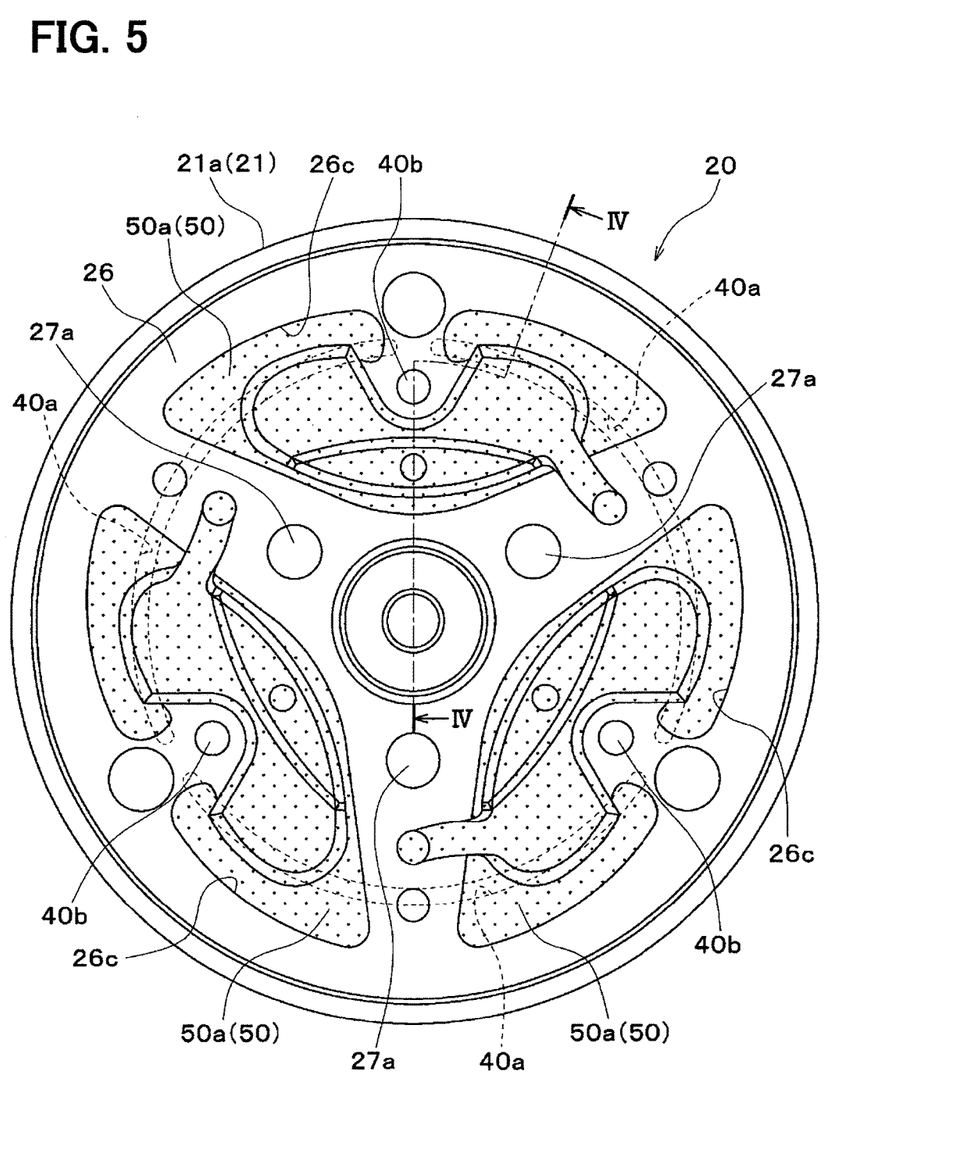
FIG. 5 is a side view illustrating the power transmission device according to the second embodiment.

In a second embodiment, a power transmission device 20 is configured as an electromagnetic clutch. That is, in the power transmission device 20 in the present embodiment, a driving rotor rotated by a rotational driving force from the engine E is connected to a driven rotor that rotates with the rotary shaft 2a of the compressor 2, by an electromagnetic force of an electromagnet 30.

More specifically, as illustrated in FIGS. 4 and 5, the power transmission device 20 in the present embodiment includes the electromagnet 30, an armature 40, and a buffer member 50 in addition to the pulley 21, the inner hub 22, and the plate 26 connected to the inner hub 22 in the first embodiment.

FIG. 4 and FIG. 5 correspond to FIG. 2 and FIG. 3 illustrating the first embodiment, respectively, and the same and similar components in the second embodiment as those in the first embodiment are given the same reference numerals. FIG. 4 is an axial partial sectional view of the power transmission device 20 in the present embodiment taken along a line IV-IV in FIG. 5. In following description, overlapping description of same or equivalent components in the first embodiments is omitted.

The electromagnet 30 receives electric power to generate an electromagnetic force for connecting the driven rotor (specifically, armature 40) to the driving rotor (specifically, pulley 21). The electromagnet 30 is made of a magnetic material (specifically, iron), and includes an annular stator 30a disposed coaxially with the rotary shaft 2a of the compressor 2, and a coil 30b received in the stator 30a.

The coil 30b is molded with an insulating resin, and is fixed to the stator 30a in the molded state, to be electrically connected to the stator 30a. The electromagnet 30 is disposed in an internal space having a cross-section of a substantially inverted-C like shape, and between the inner circumference of the outer cylindrical portion 21a of the pulley 21 and the outer circumference of the inner cylindrical portion 21b. Energization of the electromagnet 30 is switched in response to a control voltage outputted from a controller not illustrated.

The pulley 21 in the present embodiment is formed of a magnetic material (specifically, iron), and constitutes a portion of a magnetic circuit of the electromagnetic force generated by the electromagnet 30. A surface of the end face portion 21c of the pulley 21 on the opposite side to the compressor 2 forms a friction surface that contacts the armature 40 of the driven rotor when the pulley 21 is connected to the driven rotor.

A friction member 21d that increases a friction coefficient of the end face portion 21c is disposed on a portion of the surface of the end face portion 21c. The friction member 21d is made of a non-magnetic material, for example, alumina (aluminum oxide) held together with resin, or baked metal powders (specifically, aluminum powders).

When viewed in the axial direction of the rotary shaft 2a, slits 21e, 21f penetrating the end face portion 21c of the pulley 21 in the present embodiment each are shaped like an arc about the center of the rotary shaft 2a. The plurality of slits 21e, 21f are circumferentially formed in two rows when viewed in the axial direction of the rotary shaft 2a.

The armature 40 is a disc-like member that vertically extends along the rotary shaft 2a of the compressor 2, and has a through hole at its center. The armature 40 is made of a magnetic material (specifically, iron), and along with the pulley 21, constitutes a portion of a magnetic circuit of the electromagnetic force generated by the electromagnet 30.

When viewed in the axial direction of the rotary shaft 2a, slits 40a penetrating the armature 40 each are formed like an arc about the center of the rotary shaft 2a.

More specifically, as represented by thin dotted lines in FIG. 5, the plurality of (three in the present embodiment) slits 40a are circumferentially formed in one row when viewed in the axial direction. As illustrated in FIG. 4, the diameter of the slits 40a is larger than the diameter of the radial inner slit 21e in the end face portion 21c of the pulley 21, and is smaller than the diameter of the radial outer slit 21f in the end face portion 21c of the pulley 21.

The slits 21e, 21f in the end face portion 21c of the pulley 21 and the slits 40a in the armature 40 serve to suppress short circuit of the magnetic circuit generated by the electromagnet 30, enforcing the electromagnetic force for connecting the armature 40 that is the driven rotor to the pulley 21 that is the driving rotor.

One face of the armature 40 on the side of the compressor 2 is opposed to the end face portion 21c of the pulley 21, and forms a friction surface that contacts the pulley 21 when the pulley is connected to the armature 40. The other face of the armature 40 on the opposite side to the compressor 2 has a plurality of protrusion portions 40b protruding in the axial direction.

The protrusion portions 40b are fixed to the plate 26. More specifically, in the present embodiment, by flattening tips of the protrusion portions 40b inserted into respective fixing through holes in the plate 26, the plate 26 and the armature 40 are swaged together.

When the armature 40 is sucked by the electromagnetic force of the electromagnet 30 and displaces toward the pulley 21, the plate 26 in the present embodiment imposes an axial load on the armature 40 so as to separate from the pulley 21. Therefore, the plate-side through holes 26c of the plate 26 in the present embodiment are formed such that the plate 26 can be elastically deformed in the axial direction of the rotary shaft 2a properly and sufficiently.

In the present embodiment, the outer diameter of the plate 26 is the substantially same as the outer diameter of the armature 40. The inner circumference of the plate 26 in the present embodiment is fixed to the outer circumference of the disc-like portion 22a of the inner hub 22 with the rivet 27a.

The rotary shaft 2a of the compressor 2 is fixed to the cylindrical portion 22b of the inner hub 22 using a fastening means such as a bolt. The inner hub 22 may be fixed to the rotary shaft 2a using spline (serration) or key groove.

As illustrated in FIG. 4, in the present embodiment, the outer diameter of the disc-like portion 22a of the inner hub 22 is smaller than the inner diameter of the armature 40, and the inner hub 22 is disposed on the inner circumferential side of the armature 40. Accordingly, the disc-like portion 22a of the inner hub 22 in the present embodiment is not disposed so as to overlap with the substantially whole region of the plate 26.

The plate 26 in the present embodiment is integrally formed with an insert-molded buffer member 50 of substantially disc-like shape. The buffer member 50 is made of an elastically-deformable rubber material (specifically, EPDM (ethylene-propylene-dien rubber)) and thus, dampens a shock caused when the driven rotor (specifically, armature 40) is connected to the driving rotor (specifically, pulley 21).

More specifically, the buffer member 50 includes a flat portion 50a that extends over the entire region of the plate-side through holes 26c in the plate 26 and that covers the plate-side through holes 26c as represented by hatching in FIG. 5, and a thickened portion 50b that is disposed between the plate 26 and the disc-like portion 22a of the inner hub 22, and is thicker than the flat portion 50a in the axial direction of the rotary shaft 2a as illustrated in FIG. 4.

When the armature 40 is displaced toward the pulley 21 by the electromagnetic force generated by the electromagnet 30, the thickened portion 50b is interposed between the plate 26 and the inner hub 22 and elastically deforms, dampening a shock caused at connection of the armature 40 to the pulley 21.

The flat portion 50a is disposed to cover the plate-side through holes 26c and thus, as illustrated in FIG. 5, overlaps with the slits 40a of the armature 40 when viewed in the axial direction of the rotary shaft 2a.

In the present embodiment, the armature 40, the plate 26, and the inner hub 22 correspond to the driven rotor. The flat portion 50a of the buffer member 50 corresponds to an overlapping portion. The slits 40a of the armature 40 correspond to a through hole of the driven rotor.

Next, the operation of the power transmission device 20 will be described below. Since the power transmission device 20 of the present embodiment is configured as an electromagnetic clutch, when a controller outputs a control voltage to supply electric power to the electromagnet 30, the driven rotor is connected to the driving rotor by an electromagnetic force generated by the electromagnet 30.

More specifically, the armature 40 of the driven rotor is sucked toward the pulley 21 by the electromagnetic force generated by the electromagnet 30. At this time, the thickened portion 50b of the buffer member 50 is sandwiched between the plate 26 and the disc-like portion 22a of the inner hub 22, and elastically deforms, dampening a shock caused at connection of the driven rotor to the driving rotor.

With rotation of the pulley 21, the armature 40, the plate 26, and the inner hub 22, which constitute the driven rotor, integrally rotate. Thereby, the rotary shaft 2a of the compressor 2 connected to the driven rotor rotates with the driven rotor. That is, the rotational driving force outputted from the engine E is transmitted to the rotary shaft 2a of the compressor 2, causing the compressor 2 to compress and eject a refrigerant in the refrigeration cycle 1.

When the controller stops supply of electric power to the electromagnet 30, the armature 40 is separated from the pulley 21 due to a load imposed from the plate 26 onto the armature 40. This blocks transmission of the rotational driving force from the engine E to the compressor 2.

As described above, in the power transmission device 20 in the present embodiment, while the controller allows supply of electric power to the electromagnet 30, the armature 40 is connected to the pulley 21, transmitting the rotational driving force from the engine E to the compressor 2. When the controller stops supply of electric power to the electromagnet 30, the armature 40 is separated from the pulley 21, blocking transmission of the rotational driving force from the engine E to the compressor 2.

In the power transmission device 20 configured as the electromagnetic clutch as in the present embodiment, the armature 40 that forms a portion of the driven rotor has the slits 40a for enforcing the electromagnetic force. The standard electromagnetic clutch includes the buffer member 50 that dampens a shock caused when the armature 40 is connected to the pulley 21 by an electromagnetic force.

That is, in the power transmission device 20 in the present embodiment, the buffer member 50 provided in the standard electromagnetic clutch has the flat portion 50a constituting the overlapping portion, and the overlapping portion can cover the slits 40a in the armature 40 without increasing the number of components.

Consequently, as in the first embodiment, foreign objects such as water and dusts can be prevented from intruding to the friction face of the clutch and the ball bearing 23 in the power transmission device 20 without increasing manufacturing cost for the power transmission device 20, to improve reliability of the power transmission device 20.

Other Embodiments

The present disclosure is not limited to the above-mentioned embodiments, and may be modified in following various ways within the subject matter of the present disclosure.

In each of the embodiments, the power transmission device 20 is applied to transmit the rotational driving force outputted from the engine E to the compressor 2. However, application of the power transmission device 20 is not limited to the above-mentioned application. That is, the power transmission device 20 can be widely applied to transmit a rotational driving force outputted from any rotary driving source to a target device to be driven.

For example, the present disclosure may be applied to transmit a rotational driving force outputted from an engine or an electric motor to a power generator or the like.

In the first embodiment, the power transmission device 20 includes a so-called torque limiting function, that is, the break portion 25d that breaks when a torque transmitted from the driving source (engine E) to the target device to be driven (compressor 2) becomes the predetermined reference torque to block transmission of the rotational driving force from the driving source to the target device to be driven. The power transmission device 20 in the second embodiment may have a similar torque limiting function.

For example, as illustrated in FIG. 4, a thinned portion may be formed at a connection between the disc-like portion 22a and the cylindrical portion 22b of the inner hub 22, and the thinned portion may constitute a break portion that breaks when a torque transmitted from the driving rotor to the driven rotor becomes a predetermined reference torque. The power transmission device 20 in the second embodiment may have the limiter 25 in the first embodiment.

The power transmission device 20 configured as the electromagnetic clutch as in the second embodiment may include a temperature fuse that breaks when temperature becomes a predetermined reference temperature or more due to friction between the pulley 21 and the armature 40 or friction between the pulley 21 and the belt V to stop supply of electric power to the electromagnet 30, and the temperature fuse may perform the torque limiting function.

In the second embodiment, the armature 40, the plate 26, and the inner hub 22 constitute the driven rotor. However, the inner hub 22 and the buffer member 50 that rotate with the rotary shaft 2a of the compressor 2 may constitute the driven rotor, and the plate 26 connected to the inner hub 22 that constitutes the driven rotor may constitute a connection member.

With such a configuration, the flat portion 50a of the buffer member 50 of the standard electromagnetic clutch may correspond to the overlapping portion of the driven rotor, and cover the plate-side through hole (through hole of the connection member) 26c in the plate 26. This can suppress foreign objects from intruding into the power transmission device through the plate-side through holes 26c without increasing the number of components.

The inner hub 22 and the buffer member 50 that rotates with the rotary shaft 2a of the compressor 2 may constitute the driven rotor, and the plate 26 and the armature 40 that are connected to the inner hub 22 constituting the driven rotor may constitute the connection member.

With such a configuration, the flat portion 50a of the buffer member 50 in the standard electromagnetic clutch corresponds to the overlapping portion of the driven rotor, and can cover the plate-side through holes 26c in the plate 26 and the slits 40a in the armature 40. Therefore, foreign objects can be prevented from intruding into the power transmission device through the plate-side through holes 26c and the slits 40a without increasing the number of components.

The inner hub 22, the plate 26, and the buffer member 50 that rotate with the rotary shaft 2a of the compressor 2 may constitute the driven rotor, and the armature 40 connected to the plate 26 constituting the driven rotor may constitute the connection member.

With such a configuration, the flat portion 50a of the buffer member 50 in the standard electromagnetic clutch corresponds to the overlapping portion of the driven rotor, and can cover the plate-side through holes 26c in the plate 26 and the slits 40a in the armature 40. Therefore, foreign objects can be prevented from intruding into the power transmission device through the slits 40a without increasing the number of components.

In the second embodiment, the outer diameter of the disc-like portion 22a of the inner hub 22 is smaller than the inner diameter of the armature 40. However, the shape of the inner hub 22 is not limited to the above-mentioned shape. For example, the disc-like portion 22a of the inner hub 22 may have a portion extending to the outer side in the axial direction of the rotary shaft 2a (opposite side to the compressor 2) further than the armature 40, and the outer diameter of the extended portion may extend to the outer diameter of the armature 40.

With such a configuration, the inner hub 22 that rotates with the rotary shaft 2a of the compressor 2 may constitute the driven rotor, and the plate 26 and the armature 40 that are connected to the inner hub 22 constituting the driven rotor may constitute the connection member.

Thus, the disc-like portion 22a of the inner hub 22, which is required to transmit the rotational driving force from the engine E to the compressor 2, functions as the overlapping portion, and can cover the plate-side through holes 26c in the plate 26 and the slits 40a in the armature 40.

Therefore, foreign objects can be prevented from intruding into the power transmission device through the plate-side through holes 26c and the slits 40a without increasing the number of components.

The invention claimed is:

1. A power transmission device that transmits a rotational driving force outputted from a driving source to a target device to be driven, the power transmission device comprising:
   a driving rotor rotated by the rotational driving force;
   a driven rotor rotated with a rotary shaft of the target device;
   an electromagnet that generates an electromagnetic force connecting the driven rotor and the driving rotor; and
   a buffer member that dampens a shock caused when the driven rotor and the driving rotor are connected to each other, wherein:
   the drive rotor has
      an armature connected to the driving rotor by the electromagnetic force, and
      a plate that applies a load to the armature in an axial direction of the rotary shaft,
   the armature has a driven-side through hole passing through the armature in an axial direction of the rotary shaft;
   the plate has a plate-side through hole passing through the plate in the axial direction of the rotary shaft; and
   the buffer member has an overlapping portion disposed overlapping with the driven-side through hole when viewed in the axial direction of the rotary shaft in a state where the overlapping portion extends over an entire region of the plate-side through hole and covers the plate-side through hole.

2. The power transmission device according to claim 1, wherein
   the buffer member is made of rubber.

3. The power transmission device according to claim 1, wherein
the driven rotor includes a break portion that breaks when a torque transmitted from the driving source to the target device is larger than or equal to a predetermined reference torque, to block transmission of the rotational driving force from the driving source to the target device.

4. The power transmission device according to claim 1, wherein:
the driving source is an internal combustion engine; and
the target device is a compressor.

5. The power transmission device according to claim 1, wherein:
a distance between the plate and the inner hub in the axial direction is smaller than a thickness of the inner hub in the axial direction.

6. The power transmission device according to claim 1, wherein
the buffer member includes a flat portion and a thickened portion having a thickness greater than a thickness of the flat portion in the axial direction of the rotary shaft.

7. The power transmission device according to claim 6, wherein the overlapping portion is the flat portion.

8. The power transmission device according to claim 1, wherein the buffer member is an elastically-deformable rubber material.

9. The power transmission device according to claim 8, wherein the elastically-deformable rubber material is an ethylene-propylene-dien rubber.

* * * * *